United States Patent Office 3,119,834
Patented Jan. 28, 1964

3,119,834
PROCESS FOR PREPARING 2-IMIDAZOLIDINONES
Wilhelm E. Walles, Midland, Mich., assignor to The Dow Chemical Company, Midland, Mich., a corporation of Delaware
No Drawing. Filed Oct. 2, 1961, Ser. No. 142,036
4 Claims. (Cl. 260—309.7)

This invention relates to a process for preparing 2-imidazolidinones.

According to the process of the present invention, a 2-imidazolidinone having the formula:

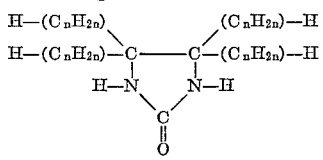

wherein $n$ is a number from 0 to 4, and the value of $n$ may be different in one or more of the four radicals in which it occurs, is prepared by reacting either cyanic acid or cyanuric acid with a 2-oxazolidinone having the formula:

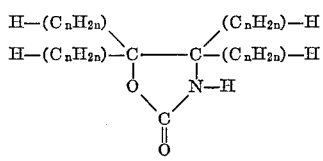

wherein $n$ has the same value as previously described. The reaction is continued until substantially maximum conversion to 2-imidazolidinone is obtained; normally from 1 to 3 hours are sufficient for such conversion. The thus-formed 2-imidazolidinone is then separated from the reaction mixture, conveniently by distillation.

The preferred temperature range for the reaction is from about 200° to about 300° C. 2-oxazolidinone is employed preferably at from about 200° to about 240° C., while the alkyl-substituted 2-oxazolidinones are preferably utilized at from about 220° to about 300° C.

Although subatmospheric and superatmospheric pressures may be employed for the reaction, atmospheric pressure is most conveniently employed and thus is preferred.

The practice of the present invention is illustrated by the following example.

*Example*

505 grams (5.0 moles) of 5-methyl-2-oxazolidinone and 205 grams (1.56 moles) of cyanuric acid were mixed in a glass resin kettle equipped with a heater, stirrer and reflux condenser and the mixture was heated for 1 hour at 260° C. 107 grams of unreacted 5-methyl-2-oxazolidinone were then distilled at 120° C. and 4 mm. pressure. Then 4-methyl-2-imidazolidinone was distilled at 164–165° C. and 5 mm. pressure. 165.5 grams of the imidazolidinone were collected representing a yield of 42 percent, based on the oxazolidinone consumed.

In addition to the imidazolidinone prepared in the preceding Example, other imidazolidinones may be prepared from the corresponding oxazolidinones by the process of the present invention, such as, for example, 2-imidazolidinone, 4,5-dimethyl-2-imidazolidinone, 4-methyl-5-ethyl-2 - imidazolidinone, 4-n-propyl-5-ethyl-2-imidazolidinone, 4 - methyl - 5-n-butyl-2-imidazolidinone, 4-ethyl-5-t-butyl-2-imidazolidinone, 4-n-butyl-5-methyl-2-imidazolidinone, 4-n-propyl-5-sec-butyl-2-imidazolidinone, and 4-n-butyl-5-t-butyl-2-imidazolidinone.

I claim:

1. A process for preparing 2-imidazolidinones having the formula:

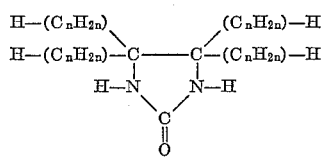

wherein $n$ is a number from 0 to 4, said process comprising, reacting at from about 200° to about 300° C. a 2-oxazolidinone having the formula:

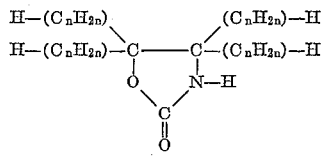

wherein $n$ has the same significance as previously described, with a nitrogen-containing compound selected from the group consisting of cyanic acid and cyanuric acid, and separating the thus-formed 2-imidazolidinone from the reaction mixture.

2. A process as in claim 1 wherein the nitrogen-containing compound is cyanuric acid.

3. A process as in claim 1 wherein the oxazolidinone is 5-methyl-2-oxazolidinone.

4. A process as in claim 1 wherein the oxazolidinone is 2-oxazolidinone.

References Cited in the file of this patent

UNITED STATES PATENTS

| | | |
|---|---|---|
| 2,977,370 | Oken | Mar. 28, 1961 |
| 2,977,371 | Dixon | Mar. 28, 1961 |
| 2,985,663 | Carmack et al. | May 23, 1961 |

OTHER REFERENCES

Beilstein: (Handbook, 4th ed.), vol. 3, p. 31 (1922).
Beilstein: (Handbook, 4th ed.), vol. 26, p. 239 (1937).
Elderfield: "Heterocyclic Compounds," vol. 5, pp. 397–8 (1957).